United States Patent [19]

Farrington et al.

[11] 4,027,076

[45] May 31, 1977

[54] SEALED LITHIUM-SODIUM ELECTROCHEMICAL CELL

[75] Inventors: Gregory C. Farrington, Elnora; Walter L. Roth, Schenectady, both of N.Y.

[73] Assignee: General Electric Company, Schenectady, N.Y.

[22] Filed: Feb. 23, 1976

[21] Appl. No.: 660,259

[52] U.S. Cl. .............................. 429/104; 429/218
[51] Int. Cl.² ........................................ H01M 4/36
[58] Field of Search ............... 136/6 F, 6 FS, 6 LN, 136/20, 83 R, 100 R, 153; 429/104, 218

[56] References Cited

UNITED STATES PATENTS

| | | | |
|---|---|---|---|
| 3,573,105 | 3/1971 | Weininger et al. | 136/86 A |
| 3,607,417 | 9/1971 | McRae et al. | 136/153 |
| 3,679,480 | 7/1972 | Brown et al. | 136/6 FS |
| 3,713,897 | 1/1973 | Liang | 136/83 R X |
| 3,773,558 | 11/1973 | Charbonnier et al. | 136/6 LN |
| 3,826,685 | 7/1974 | Dubin et al. | 136/20 X |
| 3,879,220 | 4/1975 | Will et al. | 136/83 R |
| 3,897,264 | 7/1975 | Auborn | 136/6 LN |

OTHER PUBLICATIONS

"Progress in Solid State Chemistry", No. 7, Pergamon Press, 1972, Section 5, pp. 141–175.

Primary Examiner—Anthony Skapars
Attorney, Agent, or Firm—Paul R. Webb, II; Joseph T. Cohen; Jerome C. Squillaro

[57] ABSTRACT

A sealed lithium-sodium electrochemical cell is described which comprises a casing, an anode positioned within the casing, the anode selected from the class consisting of lithium-sodium, lithium-sodium as an amalgam, and lithium-sodium in a non-aqueous electrolyte, a cathode positioned within the casing, the cathode functioning with a lithium-sodium type anode and a solid lithium-sodium aluminate electrolyte, and a solid lithium-sodium aluminate electrolyte positioned within the casing between the anode and cathode and in contact with both the anode and cathode, the solid lithium-sodium aluminate electrolyte having an approximate composition of $LiNa0.9Al_2O_3$ of which 1.3 to 85% of the total alkali ion content is lithium.

5 Claims, 1 Drawing Figure

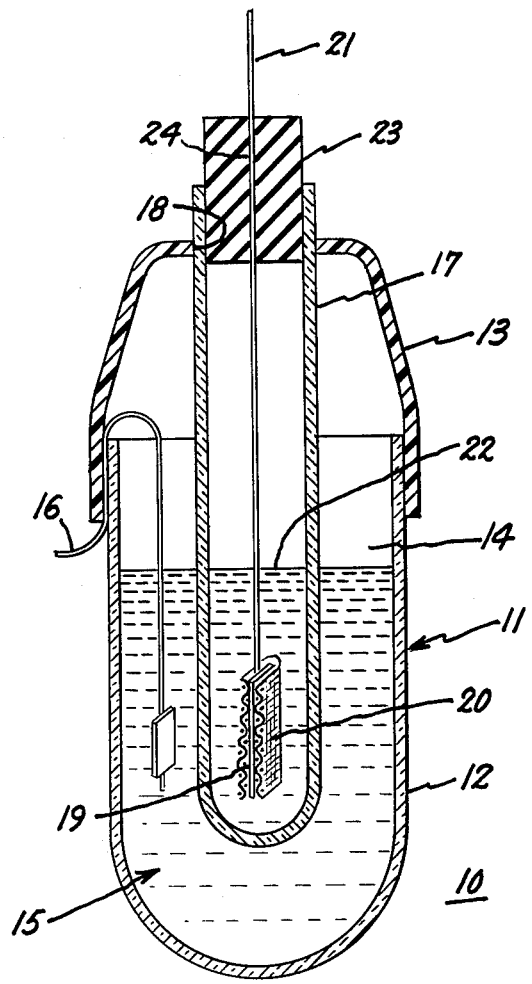

SEALED LITHIUM-SODIUM ELECTROCHEMICAL CELL

This invention relates to sealed cells and, more particularly, to such cells employing a lithium-sodium anode, a cathode, and a solid lithium-sodium aluminate electrolyte.

Cross reference is made to allowed copending patent applications Ser. Nos. 557,583 and 557,584 filed Mar. 12, 1975, in the names of Walter L. Roth and Gregory C. Farrington and entitled "Sealed Lithium-Reducible Phosphorous Oxyhalide Cell" and "Sealed Lithium-Reducible Sulfur Oxyhalide Cell", respectively. Cross-reference is made to allowed copending patent application Ser. No. 559,990 filed Mar. 19, 1975, in the names of Walter L. Roth and Gregory C. Farrington and entitled "Sealed Lithium-Sulfur Monochloride Cell". Cross-reference is made to allowed copending patent applications Ser. Nos. 571,500 and 571,556 filed Apr. 25, 1975, in the names of Gregory C. Farrington and Walter L. Roth and entitled "Sealed-Lithium Phosphorous Cell" and "Sealed Lithium-Sulfur Cell", respectively. Cross-reference is made to allowed copending patent application Ser. No. 572,278 filed Apr. 28, 1975, in the names of Gregory C. Farrington and Walter L. Roth and entitled "Sealed Lithium-Reducible Metal Salt Cell". All of the above copending applications are assigned to the same assignee as the present application.

The above applications and the subject matter thereof are hereby incorporated by reference into the present application.

Cross reference is made to copending applications Ser. Nos. 589,135; 589,136; and 589,137; filed June 23, 1975, in the names of Gregory C. Farrington and Walter L. Roth and entitled "Sealed Lithium-Iodine Cell"; "Sealed Lithium-Chlorine Cell"; and "Sealed Lithium-Bromine Cell", respectively. Cross reference is made to copending patent application Ser. No. 586,220 filed June 12, 1975, in the names of Walter L. Roth and Gregory C. Farrington and entitled "Solid State Electrochemical Cell". Cross reference is made to copending patent application Ser. No. 559,901 filed Mar. 19, 1975, in the names of Walter L. Roth and Gregory C. Farrington and entitled "Sealed Lithium-Reducible Gas Cell". All of the above copending applications are assigned to the same assignee as the present application. The above applications and the subject matter thereof are hereby incorporated by reference into the present application.

In McRae et al, U.S. Pat. No. 3,607,417 entitled "Battery Cell", there is described a battery which employs a lithium or sodium-type anode, a porous ceramic barrier including a liquid impervious thin membrane surrounding the anode, an aqueous electrolyte surrounding the barrier, an air cathode surrounding the aqueous electrolyte, an oxidant compartment surrounding the air cathode, and an oxidant of oxygen, sulfur, chlorine, or bromine which is used with lithium or sodium as specified in column 3, lines 14–19 of the patent. The McRae et al patent does not teach a lithium-sodium electrochemical cell with a solid lithium-sodium aluminate electrolyte with lithium conductivity. This patent does not teach a sealed cell, or such a cell with a non-aqueous cathode. Further, this patent does not teach the cathode in contact with the solid electrolyte.

In Weininger et al, U.S. Pat. No. 3,573,105, there is described a rechargeable non-aqueous alkali metal-halogen electrochemical cell which includes an alkali metal anode, a halogen cathode, a non-aqueous electrolyte, and an ion-permeable barrier to inhibit migration of halogen to the negative electrode between the electrodes. There is no specific lithium-sodium aluminate electrolyte between the electrodes which provides absolute separation between the electrodes including their respective liquid electrolytes or solvents excepting alkali ion transport. The electrolyte of the present invention prevents dendrites from piercing the electrolyte as opposed to the Weininger et al barrier. The electrolyte of the present invention permits cell operation at temperatures above the polymer barrier stability of Weininger et al.

In Liang U.S. Pat. No. 3,713,897, there are described electrolyte materials for high voltage solid electrolyte battery systems. This patent describes a solid ion-conductive electrolyte material containing lithium iodide, lithium hydroxide, and aluminum oxide. This patent does not describe or teach a solid ceramic electrolyte. The present electrolyte is not prone to destruction in non-aqueous solvents as opposed to the Liang patent material.

In "Progress in Solid State Chemistry", No. 7, edited by A. Reiss and J. O. McCaldin, published by Pergamon Press in 1972, there is a Section 5 entitled "$\beta$-Alumina Electrolytes" comprising pages 141–175. This Section 5 was authored by J. T. Kummer of the Ford Motor Company. Of particular interest in Section 5 are pages 149–151. On page 149, FIG. 7, equilibria are shown between $\beta$-alumina and various binary nitrate melts containing $NaNO_3$ and another metal nitrate at 300°–350° C. It will be noted from FIG. 7 that the equilibration of sodium beta-alumina with molten $LiNO_3$ results in the partial replacement of 50 percent of the sodium ion content by lithium ions. On page 151 it is discussed in lines 1–5 that the equilibration of sodium beta-alumina with molten $LiNO_3$ does not produce a complete replacement of sodium ions by lithium ions. However, it is further pointed out that complete lithium ion replacement of sodium ions in sodium beta-alumina can be effected by first exchanging sodium ions by silver ions and then silver ions by lithium ions in a melt of $LiNO_3$-LiCl. Throughout the above Kummer publication there is no recognition that the lithium-sodium $\beta$-alumina produced by equilibration of sodium beta-alumina with molten $LiNO_3$ is a unique and stable compound which can readily transport lithium ions without substantially altering its content of sodium ions.

Our present invention is directed to a sealed lithium-sodium electrochemical cell with positive separation of the anode and cathode by a solid lithium-sodium aluminate electrolyte which is lithium ion-conductive.

The primary object of our invention is to provide a lithium-sodium electrochemical cell which has high cell voltage, high energy density, and a near-zero self-discharge rate.

In accordance with one aspect of our invention, a sealed lithium-sodium electrochemical cell employs a lithium-sodium type anode, a compatible cathode, and a solid lithium-sodium aluminate electrolyte which is a lithium ion conductor therebetween.

These and various other objects, features and advantages of the invention will be better understood from the following description taken in connection with the accompanying drawing in which:

The single FIGURE is a sectional view of a lithium-sodium electrochemical cell made in accordance with our invention.

In the single FIGURE of the drawing, there is shown generally at 10 a modified sealed lithium-sodium electrochemical cell embodying our invention. An outer casing 11 comprising a lower casing portion 12 of glass and an upper casing portion 13 of polyethylene affixed tightly to the upper end of the lower casing portion 11 thereby provides a chamber 14 for a cathode 15 of a concentrated solution of bromine in a non-aqueous solvent with an ionic conductivity enhancing material and a platinum electrode 16. Electrode 16 extends to the exterior of cell 11 through the junction of the lower and upper casing portions 12 and 13. An inner casing 17 in the form of a tube of solid lithium-sodium aluminate electrolyte is positioned within lower casing portion 12 and immersed partially in cathode 15. An opening 18 is provided in the top of upper casing portion 13 into which tube 17 fits tightly. An anode 19 of lithium-sodium in the form of a lithium-sodium ribbon is pressed onto a nickel mesh 20 which is folded together and attached to the end of a nickel electrical lead 21. An anolyte 22 partially fills tube 17 and is in contact with lithium-sodium anode 19. An electrically insulating closure 23 with a hole 24 therethrough is provided at the upper end of tube 17 to seal the initially open end of the tube. Lead 21 extends through the hole 24 in closure 23 to the exterior of cell 10.

We found that we could form a sealed lithium-sodium electrochemical cell with a lithium ion-conductive electrolyte by employing a casing having a cathode portion and an anode portion. These two portions are separated by a solid lithium-sodium aluminate electrolyte which will be further described below. Such a casing may be provided in various configurations.

One such cell employs an outer casing comprising a lower casing portion of glass and an upper casing portion of a plastic such as polyethylene affixed tightly to the upper open end of the lower casing portion thereby providing a chamber for a cathode in a catholyte which functions with a lithium-sodium type anode and a solid lithium-sodium aluminate electrolyte. An electrode extends from the cathode to the exterior of the cell through the junction of the lower and upper casing portions. An inner casing in the form of a tube of solid lithium-sodium aluminate electrolyte is positioned within the outer casing and immersed partially in the cathode. An opening is provided in the top of the upper casing portion into which the tube fits tightly. An anode of lithium-sodium metals in the form such as lithium-sodium ribbon pressed onto a nickel mesh is folded together and attached to the end of a nickel electrical lead. An anolyte partially fills the tube and is in contact with the lithium anode. An electrically insulating closure with a hole therethrough is provided at the upper end of the tube to seal the initially open end of the tube. The lead extends through the hole in the closure to the exterior of the cell.

We found that we could employ mixed lithium and sodium anodes in which the lithium was present from 1 weight percent to 99 weight percent with the balance being sodium. Such anodes function with the solid lithium-sodium aluminate electrolyte which has an approximate composition of $LiNaO \cdot 9Al_2O_3$ and which has 1.3% to 85% of the total alkali ion content in lithium. The anode can employ lithium-sodium, lithium-sodium as an amalgam, or lithium-sodium in a non-aqueous electrolyte. We found further that we could vary the composition of the lithium-sodium anode and vary also the lithium content. When we employ lithium-sodium in non-aqueous electrolytes, the preferred electrolyte or anolyte is 0.1M tetrabutylammonium tetrafluoroborate ($TBABF_4$) in propylene carbonate saturated with $LiClO_4$.

In the above-mentioned allowed copending patent applications, lithium, lithium as an amalgam, or lithium in a non-aqueous electrolyte or anolyte is employed as the anode. There is no disclosure, teaching, or suggestion in any of the above-referenced copending patent applications of applicants' invention employing a lithium-sodium anode in a cell with a solid lithium-sodium aluminate electrolyte and a compatible cathode.

A wide variety of cathodes are suitable which will function with the lithium-sodium anode and the above-described solid electrolyte. Such suitable cathodes include halogens of chlorine, bromine, and iodine; sulfur; phosphorous; a reducible metal salt such as nickel chloride, lead sulfide, silver oxide, cupric fluoride, and lead iodide; a reducible gas such as sulfur dioxide; a reducible sulfur oxyhalide such as thionyl chloride; Fe (III), and oxygen. Each cathode includes an electrode and is contained in a catholyte.

We found that a suitable catholyte for the above cathodes, except for thionyl chloride, Fe (III) and oxygen, was a non-aqueous catholyte of 0.1M tetrabutylammonium fluoroborate in propylene carbonate saturated with $LiClO_4$. A suitable aqueous catholyte for Fe (III) and oxygen is 0.1M nitric acid in water. Thionyl chloride is employed undiluted.

We found that the above cathodes were suitably used in the following manner:

| Cathodes | Manner Used |
| --- | --- |
| Chlorine and sulfur dioxide | Saturated solution in above-described non-aqueous catholyte used with platinum electrode. |
| Bromine and iodine | Concentrated solution in above-described non-aqueous catholyte used with platinum electrode. |
| Sulfur, phosphorous, nickel chloride, lead sulfide, silver oxide, cupric fluoride, and lead iodide | Each was pressed as anhydrous powder on an expanded nickel mesh cathodic electrode in above-described non-aqueous catholyte. |
| Thionyl chloride | Undiluted. |
| Fe (III) | Concentrated solution of $FeCl_3$ in above-described aqueous catholyte used with platinum electrode. |
| Oxygen | Saturated solution in above-described aqueous catholyte used with platinum electrode. |

A cell made in accordance with our invention was formed of an outer casing having a lower casing portion of glass and an upper casing portion of polyethylene adapted to be affixed tightly to the upper open end of the lower casing thereby providing a chamber for the cathode which consisted of a concentrated solution of bromine in a nonaqueous catholyte of 0.1M tetrabutylammonium fluoroborate in propylene carbonate saturated with $LiClO_4$. A platinum electrode was immersed in the cathode and extended to the exterior of the cell through the junction of the lower and upper casing portions. An inner casing in the form of a tube of solid lithium-sodium aluminate electrolyte with a total alkali ion content of 1.3 weight percent lithium was positioned within the outer casing and immersed partially in the cathode by affixing tightly the upper casing portion to the lower casing portion. An opening was provided in the top of the upper casing portion into which the tube fitted tightly. An anode of 99 weight percent lithium and 1 weight percent sodium, which were mixed together was pressed onto a nickel mesh which was folded together and attached to the end of a nickel electrical lead. An anolyte of 0.1M tetrabutylammonium tetrafluoroborate in propylene carbonate saturated with $LiClO_4$ partially filled the tube and was in contact with the lithium-sodium anode. An electrically insulating closure with a hole therethrough was provided at the upper end of the tube to seal the initially open end of the tube. The lead extended through the hole in the closure to the exterior of the cell. The resulting device was a sealed lithium-sodium electrochemical cell which was made in accordance with our invention.

Examples of lithium-sodium electrochemical cells made in accordance with our invention are set forth below.

EXAMPLES I-II

Two cells, Numbers 1 and 2, without reactants which are Examples I and II, were assembled partially as generally described above and as shown in the single FIGURE of the drawing. Each of the cells was constructed in the same manner with the exception that cell Number 1 had a lithium-sodium aluminate tube with a 1.3 percent lithium ion content while cell Number 2 had a lithium-sodium aluminate tube with a 85.0 percent lithium ion content. The remaining alkali ion content of each tube was sodium ions.

The tube for cell Number 1 was formed from a tube of sodium $\beta$-alumina approximately 6.2 cm. long, 1.1 cm. OD, and 0.15 cm. wall thickness. The tube is baked out overnight at 1175° C prior to lithium ion exchange. The lithium ion exchange was made by immersion in 20 mole percent lithium nitrate and 80 mole percent sodium nitrate at 400° C for 72 hours. A resulting 0.049 percent weight decrease corresponded to 1.3 percent sodium substitution by lithium ions.

The tube for cell Number 2 was formed from an identical sodium $\beta$-alumina tube which was baked out in the same manner. The lithium ion exchange was made by immersion in lithium nitrate at 600° C for 13 hours. A resulting 3.2 percent weight decrease corresponded to 84.7 percent sodium substitution by lithium ions.

For each cell, an outer casing was formed of a lower casing portion of glass and an upper casing portion of polyethylene adapted to be affixed tightly to the upper open end of the lower casing portion thereby providing a chamber for each cathode in a catholyte including an electrode or electrical lead which extended to the exterior of the cell through the junction of the lower and upper casing portions. An inner casing in the form of a tube of solid lithium-sodium aluminate electrolyte was positioned within each outer casing and adapted to be in contact with the cathode. The tube for cell Number 1 contained 1.3 percent lithium ion content while the tube for cell Number 2 contained 85.0 percent lithium ion content. An opening was provided in the top of each upper casing portion into which the respective tube fitted tightly. An anode in an anolyte was adapted to be in contact with the inner surface of the tube. An electrical lead was provided to contact the anode. An electrically insulating closure with a hole therethrough was provided at the upper end of each tube to seal the initially open end of the tube. The lead extended through the hole in the closure to the exterior of the cell.

EXAMPLES III-XVI

Fourteen lithium-sodium electrochemical cells were made which are cells Numbers 3-16. Each of these cells was formed of an outer casing having a lower casing portion of glass and an upper casing portion of polyethylene adapted to be affixed tightly to the upper end of the lower casing thereby providing the chamber for a cathode in a catholyte with an electrolyte, which cathode functions with a lithium-sodium type anode in a solid lithium-sodium aluminate electrolyte. Each electrode was immersed in the cathode and extended to the exterior of the cell through the junction of the lower and upper casing portions. The catholyte which was employed in cells 3-13 was a non-aqueous catholyte of 0.1M tetrabutylammonium fluoroborate in propylene carbonate saturated with $LiClO_4$. The catholyte for cell 14 was the cathode material thionyl chloride in undiluted form. The catholyte for cells 15 and 16 was an aqueous solution of 0.1M nitric acid in water. The catholdes for cells 3-16 were, respectively, chlorine, bromine, iodine, sulfur, phosphorous, nickel chloride, lead sulfide, silver oxide, cupric fluoride, lead iodide, sulfur dioxide, Fe (III), and oxygen. These cathodes and the manner that they were employed in their respective cells 3-16 are set forth below:

| Cathodes | Manner Used |
| --- | --- |
| Chlorine and sulfur dioxide | Saturated solution in above-described non-aqueous catholyte used with platinum electrode. |
| Bromine and iodine | Concentrated solution in above-described non-aqueous catholyte used with platinum electrode. |
| Sulfur, phosphorous, nickel chloride, lead sulfide, silver oxide, cupric fluoride, and lead iodide | Each was pressed as anhydrous powder on an expanded nickel mesh cathodic electrode in above-described non-aqueous catholyte. |
| Thionyl chloride | Undiluted. |
| Fe (III) | Concentrated solution of $FeCl_3$ in above-described aqueous catholyte used with platinum electrode. |
| Oxygen | Saturated solution in above-described aqueous catholyte used with platinum electrode. |

An inner casing in the form of a tube of solid lithium-sodium aluminate electrolyte with a total alkali ion content of 1.3 weight percent lithium was positioned within the outer casing of each of cells 3-16 and immersed partially in each of the respective cathodes by affixing tightly the upper casing portion to the lower casing portion. An opening was provided in the tube of each upper casing portion into which the tube fitted tightly. An anode of the same composition was employed for each of the cells 3-16. The anode consisted of 99 weight percent lithium and 1 weight percent sodium, which were mixed together and were pressed onto a nickel mesh which was folded together and attached to the end of a nickel electrical lead. Each anolyte filled partially the respective tube that was in contact with the respective lithium-sodium anode. An electrically insulating enclosure with a hole therethrough was provided at the upper end of each tube to seal the initially open end of each tube. Each lead extended through the respective hole in the closure to the exterior of each cell. Each of the resulting 14 devices was a sealed lithium-sodium electrochemical cell which was made in accordance with our invention.

Table I, which is set forth below, sets forth for cells 3–16 the cell potential in volts (V) as a function of current in milliamperes (mA). Each cell is identified by number as well as by the cathode employed therein. Each of the cells was operated at a temperature of 26° C.

TABLE I

| Current mA | 3 −$Cl_2$ | 4 $Br_2$ | 5 $I_2$ | 6 S | 7 P | 8 $NiCl_2$ | | |
|---|---|---|---|---|---|---|---|---|
| Open Circuit | 4.12 | 4.13 | 3.73 | 3.02 | 2.94 | 2.94 | | |
| 0.020 | 4.05 | 4.08 | 3.66 | 2.66 | 2.62 | 2.55 | | |
| 0.040 | 3.78 | 4.01 | 3.58 | 2.39 | 2.38 | 2.23 | | |
| 0.060 | 3.90 | 3.94 | 3.50 | 2.15 | 2.21 | 1.93 | | |
| 0.080 | 3.82 | 3.88 | 3.43 | 1.99 | 2.04 | 1.68 | | |
| 0.100 | 3.73 | 3.82 | 3.36 | 1.88 | 1.89 | 1.43 | | |
| 0.200 | 3.42 | 3.59 | 3.11 | — | — | — | | |
| 0.400 | 2.89 | 3.20 | 2.73 | — | — | — | | |
| 0.600 | 2.48 | 2.94 | 2.49 | — | — | — | | |
| 0.800 | 2.13 | 2.71 | 2.26 | — | — | — | | |
| 1.00 | 1.86 | 2.52 | 2.02 | — | — | — | | |
| 2.00 | — | 2.02 | — | — | — | — | | |
| 4.0 | — | 0.94 | — | — | — | — | | |
| 6.0 | — | 0.06 | — | — | — | — | | |
| 8.0 | — | — | — | — | — | — | | |
| 10.0 | — | — | — | — | — | — | | |
| Current mA | 9 PbS | 10 AgO | 11 $CuF_2$ | 12 $PbI_2$ | 13 $SO_2$ | 14 $SOCl_2$ | 15 Fe(III) | 16 $O_2$ |
| Open Circuit | 3.13 | 3.50 | 3.37 | 2.88 | 3.38 | 4.18 | 3.50 | 3.49 |
| 0.020 | 3.07 | 3.46 | 3.31 | 2.37 | 3.10 | 3.86 | 3.23 | 3.47 |
| 0.040 | 3.00 | 3.37 | 3.24 | 2.09 | 2.87 | 3.63 | 3.16 | 3.42 |
| 0.060 | 2.92 | 3.30 | 3.18 | 2.01 | 2.71 | 3.42 | 3.11 | 3.39 |
| 0.080 | 2.83 | 3.23 | 3.12 | 1.94 | 2.59 | 3.21 | 3.06 | 3.35 |
| 0.100 | 2.74 | 3.16 | 3.06 | 1.86 | 2.49 | 3.02 | 3.02 | 3.31 |
| 0.200 | 2.49 | 2.91 | 2.83 | — | — | 2.39 | 2.87 | 3.21 |
| 0.400 | 2.02 | 2.47 | 2.41 | — | — | 0.92 | 2.64 | 3.08 |
| 0.600 | 1.68 | 2.14 | 2.09 | — | — | — | 2.50 | 2.98 |
| 0.800 | 1.41 | 1.88 | 1.82 | — | — | — | 2.42 | 2.89 |
| 1.00 | 1.19 | 1.63 | 1.58 | — | — | — | 2.34 | 2.80 |
| 2.00 | — | — | — | — | — | — | 2.01 | 2.38 |
| 4.0 | — | — | — | — | — | — | 1.55 | 1.52 |
| 6.0 | — | — | — | — | — | — | 1.20 | 1.06 |
| 8.0 | — | — | — | — | — | — | 0.88 | 0.66 |
| 10.0 | — | — | — | — | — | — | 0.55 | 0.24 |

Table II, which is set forth below, sets forth for cells 17–25 the cell potential in volts (V) as a function of current in milliamperes (mA). Each cell is identified by number as well as by the cathode employed therein. Each of the cells was operated at a temperature of 26° C.

TABLE II

| Current mA | 17 $Br_2$ | 18 $I_2$ | 19 S | 20 P | 21 $NiCl_2$ |
|---|---|---|---|---|---|
| Open Circuit | 4.02 | 3.71 | 2.92 | 2.88 | 2.87 |
| 0.020 | 3.97 | 3.59 | 2.61 | 2.53 | 2.52 |
| 0.040 | 3.88 | 3.47 | 2.35 | 2.30 | 2.24 |
| 0.060 | 3.79 | 3.34 | 2.13 | 2.11 | 1.96 |
| 0.080 | 3.70 | 3.23 | 1.92 | 1.93 | 1.68 |
| 0.100 | 3.61 | 3.12 | 1.76 | 1.75 | 1.44 |
| 0.200 | 3.32 | 2.80 | — | — | — |
| 0.400 | 2.83 | 2.32 | — | — | — |
| 0.600 | 2.44 | 1.94 | — | — | — |
| 0.800 | 2.12 | 1.61 | — | — | — |
| 1.0 | 1.85 | 1.36 | — | — | — |

EXAMPLES XVII–XV

Nine lithium-sodium electrochemical cells were made which were cell numbers 17–25. Each of these cells was formed as described above in examples I–XVI. In each of the cells 17–25, the inner casing was in the form of a tube of solid lithium-sodium aluminate electrolyte with a total alkali ion content of 1.3 weight percent lithium. An anode of the same composition was employed for each of the cells 17–25. The anode consisted of 1 weight percent lithium and 99 weight percent sodium, which were mixed together and were pressed onto a nickel mesh which was folded together and attached to the end of the nickel electrical lead, as described above in previous examples III–XVI. Each of the resulting devices was a sealed lithium-sodium electrochemical cell which was made in accordance with our invention.

| Current mA | 22 PbS | 23 AgO | 24 $CuF_2$ | 25 $PbI_2$ |
|---|---|---|---|---|
| Open Circuit | 3.08 | 3.35 | 3.29 | 2.92 |
| 0.020 | 3.01 | 3.27 | 3.25 | 2.43 |
| 0.040 | 2.93 | 3.20 | 3.18 | 2.06 |
| 0.060 | 2.85 | 3.12 | 3.12 | 1.87 |
| 0.080 | 2.76 | 3.03 | 3.03 | 1.82 |
| 0.100 | 2.66 | 2.97 | 2.97 | 1.75 |
| 0.200 | 2.38 | 2.71 | 2.70 | — |
| 0.400 | 1.84 | 2.21 | 2.21 | — |
| 0.600 | 1.43 | 1.83 | 1.85 | — |
| 0.800 | 1.09 | 1.49 | 1.51 | — |
| 1.00 | 0.79 | 1.21 | 1.21 | — |

EXAMPLES XXVI–XXXIV

Nine lithium-sodium electrochemical cells were made which were cell numbers 26–34. Each of these cells was formed as described above in examples I-XVI. In each of the cells 26-34, the inner casing was in the form of a tube of solid lithium-sodium aluminate electrolyte with a total alkali ion content of 85 percent lithium. An anode of the same composition was employed for each of the cells 26-34. The anode consisted of 99 weight percent lithium and 1 weight percent sodium, which were mixed together and were pressed nto a nickel mesh which was folded together and attached to the end of the nickel electrical lead, as described above in previous examples III-XVI. Each of the resulting nine devices was a sealed lithium-sodium electrochemical cell which was made in accordance with our invention.

Table III, which is set forth below, sets forth for cells 26-34 the cell potential in volts (V) as a function of current in milliamperes (mA). Each cell is identified by number as well as by the cathode employed therein. Each of the cells was operated at a temperature of 26° C.

TABLE III

| Current mA | 26 Br$_2$ | 27 I$_2$ | 28 S | 29 P | 30 NiCl$_2$ |
|---|---|---|---|---|---|
| Open Circuit | 4.14 | 3.83 | 2.88 | 2.96 | 2.93 |
| 0.020 | 3.77 | 3.39 | 2.17 | 2.35 | 2.27 |
| 0.040 | 3.36 | 2.89 | 1.46 | 2.75 | 1.59 |
| 0.060 | 3.05 | 2.51 | 0.96 | 1.29 | 0.99 |
| 0.080 | 2.79 | 2.20 | 0.48 | 0.91 | 0.48 |
| 0.100 | 2.55 | 1.92 | 0.25 | 0.58 | 0.05 |
| 0.200 | 1.85 | — | — | — | — |
| 0.400 | 0.61 | — | — | — | — |

| Current mA | 31 PbS | 32 AgO | 33 CuF$_2$ | 34 PbI$_2$ |
|---|---|---|---|---|
| Open Circuit | 3.10 | 3.36 | 3.53 | 3.00 |
| 0.020 | 2.76 | 3.03 | 3.02 | 2.11 |
| 0.040 | 2.33 | 2.62 | 2.61 | 1.32 |
| 0.060 | 1.99 | 2.29 | 2.28 | 0.95 |
| 0.080 | 1.68 | 2.01 | 1.99 | 0.63 |
| 0.100 | 1.41 | 1.86 | 1.73 | 0.35 |
| 0.200 | — | — | — | — |
| 0.400 | — | — | — | — |

EXAMPLES XXV-XLIII

Nine lithium-sodium electrochemical cells were made which were cell numbers 35-43. Each of these cells was formed as described above in examples I-XVI. In each of the cells 35-43, the inner casing was in the form of a tube of solid lithium-sodium aluminate electrolyte with a total alkali ion content of 85 weight percent lithium. An anode of the sample composition was employed for each of the cells 35-43. The anode consisted of 1 weight percent lithium and 99 weight percent sodium, which were mixed together and were pressed onto a nickel mesh which was folded together and attached to the end of the nickel electrical lead, as described above in previous examples III-XVI. Each of the resulting nine devices was a sealed lithium-sodium electrochemical cell which was made in accordance with our invention.

Table IV, which is set forth below, sets forth for cells 35-43 the cell potential in volts (V) as a function of current in milliamperes (mA). Each cell is identified by number as well as by the cathode employed therein. Each of the cells was operated at a temperature of 26° C.

TABLE IV

| Current mA | 35 Br$_2$ | 36 I$_2$ | 37 S | 38 P | 39 NiCl$_2$ |
|---|---|---|---|---|---|
| Open Circuit | 4.07 | 3.66 | 2.92 | 2.83 | 2.84 |
| 0.020 | 3.71 | 3.25 | 2.21 | 2.20 | 2.10 |
| 0.040 | 3.35 | 2.88 | 1.59 | 1.62 | 1.41 |
| 0.060 | 3.08 | 2.61 | 1.09 | 1.19 | 0.85 |
| 0.080 | 2.86 | 2.36 | 0.72 | 0.83 | 0.37 |
| 0.100 | 2.63 | 2.13 | 0.42 | 0.51 | 0.00 |
| 0.200 | 2.02 | 1.50 | — | — | — |
| 0.400 | 0.84 | 0.30 | — | — | — |

| Current mA | 40 PbS | 41 AgO | 42 CuF$_2$ | 43 PbI$_2$ |
|---|---|---|---|---|
| Open Circuit | 3.02 | 3.28 | 3.26 | 2.72 |
| 0.020 | 2.65 | 2.95 | 2.89 | 1.90 |
| 0.040 | 2.23 | 2.55 | 2.48 | 1.22 |
| 0.060 | 1.91 | 2.34 | 2.15 | 0.87 |
| 0.080 | 1.61 | 1.98 | 1.88 | 0.54 |
| 0.100 | 1.35 | 1.73 | 1.62 | 0.25 |
| 0.200 | — | — | — | — |
| 0.400 | — | — | — | — |

While other modifications of the invention and variations thereof which may be employed within the scope of the invention have not been described, the invention is intended to include such as may be embraced within the following claims.

What we claim as new and desire to secure by Letters Patent of the United States is

1. A sealed lithium-sodium electrochemical cell comprises a casing, an anode positioned within the casing, the anode selected from the class consisting of lithium-sodium, lithium-sodium as an amalgam, and lithium-sodium in a non-aqueous electrolyte, the anode consisting of from 1.0 weight percent to 99.0 weight percent lithium and the balance being sodium, a cathode positioned within the casing, the cathode functioning with an anode selected from the class consisting of lithium-sodium, lithium-sodium as an amalgam, and lithium-sodium in a non-aqueous electrolyte and a solid lithium-sodium aluminate electrolyte, and a solid lithium-sodium aluminate electrolyte positioned within the casing between the anode and cathode, the solid lithium-sodium aluminate electrolyte having an approximate composition of LiNaO·9Al$_2$O$_3$ of which 1.3 to 85.0 percent of the total alkali content is lithium.

2. A sealed lithium-sodium electrochemical cell as in claim 1, in which the anode consists of 99 weight percent lithium and 1 weight percent sodium, and the total alkali ion content of the electrolyte is 1.3 percent lithium.

3. A sealed lithium-sodium electrochemical cell as in claim 1, in which the anode consists of 1 weight percent lithium and 99 weight percent sodium, and the total alkali ion content of the electrolyte is 1.3 percent lithium.

4. A sealed lithium-sodium electrochemical cell as in claim 1, in which the anode consists of 99 weight percent lithium and 1 weight percent sodium, and the total alkali ion content of the electrolyte is 85 percent lithium.

5. A sealed lithium-sodium electrochemical cell as in claim 1, in which the anode consists of 1 weight percent lithium and 99 percent sodium, and the total alkali ion content of the electrolyte is 85 percent lithium.

* * * * *